United States Patent
Kuroda et al.

(10) Patent No.: US 6,469,740 B1
(45) Date of Patent: Oct. 22, 2002

(54) PHYSICAL QUANTITY DISTRIBUTION SENSOR AND METHOD FOR DRIVING THE SAME

(75) Inventors: Takao Kuroda, Osaka (JP); Masayuki Masuyama, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/017,215

(22) Filed: Feb. 2, 1998

(30) Foreign Application Priority Data

Feb. 4, 1997 (JP) .............................. 9-021172

(51) Int. Cl.⁷ ...................... H04N 5/335; H04N 5/217
(52) U.S. Cl. ...................... 348/308; 348/241; 348/301
(58) Field of Search ................................ 348/301, 207, 348/241, 243, 251, 300, 308, 302; 327/91, 92, 93, 94, 95, 96

(56) References Cited

U.S. PATENT DOCUMENTS

| | | | | |
|---|---|---|---|---|
| 4,556,851 A | * | 12/1985 | Levine ........................ | 348/241 |
| 4,839,729 A | * | 6/1989 | Ando et al. .................. | 348/241 |
| 4,942,474 A | * | 7/1990 | Akimoto et al. ............. | 348/241 |
| 4,945,420 A | * | 7/1990 | Berger et al. ................ | 348/241 |
| 5,162,912 A | * | 11/1992 | Ueno et al. .................. | 348/241 |
| 5,335,015 A | * | 8/1994 | Cooper et al. ............... | 348/241 |
| 5,382,975 A | * | 1/1995 | Sakai et al. .................. | 348/241 |
| 5,493,423 A | * | 2/1996 | Hosier ......................... | 348/241 |
| 5,892,540 A | * | 4/1999 | Kozlowski et al. ......... | 348/300 |
| 5,926,214 A | * | 7/1999 | Denyer et al. ............... | 348/241 |
| 6,031,570 A | * | 2/2000 | Yang et al. .................. | 348/241 |
| 2001/0010551 A1 | * | 8/2001 | Dierickx ...................... | 348/241 |

FOREIGN PATENT DOCUMENTS

| | | |
|---|---|---|
| JP | 60-169282 | 9/1985 |
| JP | 05252445 | 9/1993 |

* cited by examiner

*Primary Examiner*—Tuan Ho
*Assistant Examiner*—Lin Ye
(74) *Attorney, Agent, or Firm*—McDermott, Will & Emery (57) ABSTRACT

A physical quantity distribution sensor including a plurality of unit cells. Each unit cell includes an information storage region responsive to a physical stimulus and capable of a transition from a first electrical potential state to a second electrical potential state according to the physical stimulus, a driving element for providing at an output portion thereof an electrical potential according to the electrical potential state of the information storage region, and a switching element for selecting the unit cell. The physical quantity distribution sensor further includes an output adjustment section capable of adjusting the first electrical potential state of the information storage region in order that the output of the selected driving element may substantially equal a reference electrical potential at the time when the switching element is in the conductive state.

42 Claims, 8 Drawing Sheets

PHYSICAL QUANTITY DISTRIBUTION SENSOR AND METHOD FOR DRIVING THE SAME

BACKGROUND OF THE INVENTION

This invention relates to physical quantity distribution sensors and it further relates to physical quantity distribution sensor driving methods.

Recently, there have been increasing demands for physical quantity distribution sensors used for the detection of the one-/two-dimensional distribution of various physical quantities. In the field of solid-state imaging technology for detecting a light intensity as a physical quantity, a so-called amplification type solid-state imaging device has attracted attention. A typical amplification type solid-state imaging device has a plurality of picture elements each comprising a photoelectric conversion section operable to generate a signal charge by photoelectric conversion of light incident thereon, a storage region for storing the signal charge, and a driving element such as a field-effect transistor (FET) for providing a signal according to the signal charge. The storage region is connected to a gating control region of the driving element such as a FET gate region and bipolar transistor base region, to achieve control of the output value of the driving element by the electrical potential of the storage region that varies according to signal charge amounts stored therein. Some amplification type solid-state imaging devices employ a storage region that serves also as a transistor gating control region.

Although such an imaging device has amplifying transistors functioning as driving elements allocated to each pixel, these amplifying transistors differ in transistor characteristic from one another. If the characteristic of a transistor in the absence of signal charge, for instance, the threshold voltage, Vt, of a FET, varies, this results in variations in the output value of the transistor even when each photoelectric conversion section is illuminated by the same amount of incident light thereby equalizing the electrical potentials of the gating control regions. As a result, spatially fixed noise, known as fixed pattern noise (FPN), occurs, therefore causing severe damage to the qualities of image.

Japanese Patent Application Laying Open Gazette No. 5-252445 shows an amplification type solid-state imaging device with a view to preventing the occurrence of FPN. This prior art imaging device is described with reference to FIG. 8. An amplifying transistor M1 for amplifying a sensor potential, $V_S$, is disposed for each pixel. A feedback circuit 3 including a differential amplifier 2 is provided which supervises the channel electrical potential of the transistor M1 and fixes same at a reference electrical potential, $V_R'$, at reset operation time. A reset is carried out by adjustment of $V_S$ using the output of the amplifier 2 at the time when a reset transistor M3 is electrically conductive. The FIG. 8 imaging device circuitally achieves a reduction of the variation in Vt of the transistor M1.

Figure 8:
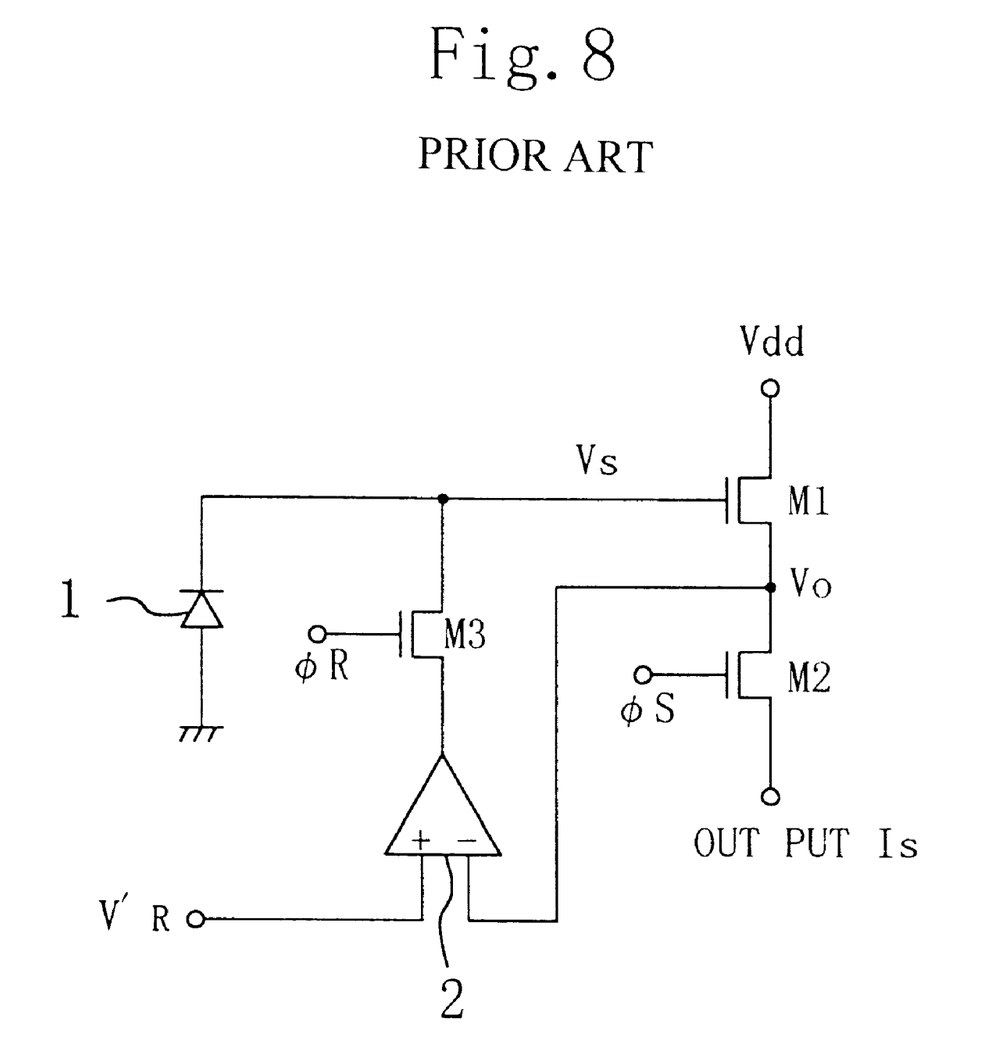
FIG. 8 is a circuit diagram showing a major portion of a commonly-used physical quantity distribution sensor.

In such a prior art imaging device, at the time of supervising the channel electrical potential of the transistor M1 of each pixel, a switching transistor M2 is placed in an electrically non-conductive (off) state and an electrical potential at a node between the transistors M1 and M2 is applied to an input section of the amplifier 2. The reason for this may be that the imaging device employs a structure in which the magnitude of a current flowing in the transistor M1 is read as an output, $I_S$, and it is impossible to detect the channel electrical potential of the transistor M1 at the time when the transistor M2 is electrically conductive. It is required that the electrical potential at the node between the transistors M1 and M2, $V_0$, be applied to the amplifier 2. This requires extra interconnection lines for providing connections between each pixel and the amplifier 2. In order to perform feedback on every pixel by the single amplifier 2, it is necessary to newly provide transistors to each pixel in addition to the switching transistors used for pixel selection. Accordingly, it is impractical for area sensors, in which a great number of pixels are 2-D arranged, to adopt the above-described structure.

Feedback operations by the amplifier 2 are performed, not at the time when signal charge stored in a photo sensor 1 is read through the transistors M1 and M2, but at the time when the transistor M2 is in the non-conductive state. In accordance with the prior art technique, feedback is not carried out based on the output in the same state as that of the actual output operation time, which results in insufficient improvements on the accuracy of feedback.

Accordingly, an object of the present invention is to provide physical quantity distribution sensors and its driving methods for getting rid of noise due to variations in the characteristics of driving elements by high-accuracy feedback.

SUMMARY OF THE INVENTION

The present invention provides a physical quantity distribution sensor comprising a plurality of unit cells, each such unit cell including: an information storage region responsive to a physical stimulus and capable of a transition from a first electrical potential state to a second electrical potential state according to the physical stimulus; a driving element for providing at an output portion thereof an electrical potential according to the electrical potential state of the information storage region; and a switching element connected to the output portion of the driving element; the physical quantity distribution sensor further comprising: an output section for receiving, when the switching element is electrically conductive, an output from the driving element which is connected to the switching element and outputting a signal according to the electric potential state of the information storage region; an output adjustment section for receiving, when the switching element is electrically conductive, the output from the driving element and adjusting the first electrical potential state of the information storage region in order that the output from the driving element may substantially equal a reference electrical potential; and a unit cell selector for controlling an electrically conductive/non-conductive state of the switching element.

In a preferred embodiment, the driving element is a MOS transistor having: a gate connected to the information storage region; a source for functioning as the output portion and connected to the output section; and a drain for receiving a supply voltage.

In a preferred embodiment, the physical quantity distribution sensor further comprises a load element connected to the source of the driving element wherein the driving element and the load element together form a source follower circuit.

In a preferred embodiment, the switching element is a MOS transistor having: a gate for receiving a signal from the unit cell selector; a drain connected to the source of the driving element; and a source connected to the output section.

In a preferred embodiment, the information storage region has: a sensing section for converting the physical stimulus into an electric charge; and a storage section for storing the electric charge.

In a preferred embodiment, the sensing section is a p-n junction type photoelectric conversion element.

In a preferred embodiment, the storage section is a p-n junction type capacitor element.

In a preferred embodiment, each of the plurality of unit cells further includes a reset element operable to perform a forcible reset of the electrical potential state of the information storage region to the first electrical potential state in response to a reset pulse.

In a preferred embodiment, the reset element is a MOS transistor that receives at a gate region thereof the reset pulse.

In a preferred embodiment, the reset element is a MOS transistor that receives at a gate region thereof the output of the output adjustment section.

In a preferred embodiment, the output of the output adjustment section is supplied, through the reset element, to the information storage region at the time when the reset element performs a reset of the electrical potential state of the information storage region.

In a preferred embodiment, the output of the output adjustment section is supplied to a gate region of the reset element when the reset element performs a reset of the electrical potential state of the information storage region.

In a preferred embodiment, the plurality of unit cells being divided into a plurality of groups; the output adjustment section containing a plurality of functionally identical adjusters; and the plurality of groups being assigned the adjusters, respectively.

In a preferred embodiment, each such adjuster is formed by an operational amplifier, or an inverting differential amplifier, or a comparator.

In a preferred embodiment, the plurality of adjusters are fed the reference electrical potential through a common line.

In a preferred embodiment, the plurality of unit cells are arranged forming a matrix of rows and columns; the unit cell selector has row selection circuits for selecting respective rows of unit cells of the matrix; and an output of the row selection circuit causes the switching elements of a selected row of unit cells to conduct and allows the reset pulse to be transmitted to the reset elements of the selected row of unit cells.

In a preferred embodiment, (a) the plurality of unit cells are arranged forming a matrix of rows and columns; (b) the unit cell selector has: column selection circuits for selecting respective columns of unit cells of the matrix; and column selection elements connected between each of the columns of unit cells and the output section; and (c) the column select element supplies, in response to an output of the column selection circuit, the output of the driving element in the unit cell in a selected column to the output section.

In a preferred embodiment, (a) the plurality of unit cells are arranged to form a matrix of rows and columns; (b) the unit cell selector has: column selection circuits for selecting respective columns of unit cells of the matrix; column selection elements connected between each of the columns of unit cells and the output section; and selected column reset elements connected between each of the columns of unit cells and an input section at which the reset pulse is applied; (c) the column select element supplies, in response to an output of the column selection circuit, the output of the driving element in the unit cell in a selected column to the output section; and (d) the selected column reset element applies, in response to the output of the column selection circuit, the reset pulse to the reset element in the selected column.

The present invention provides a physical quantity distribution sensor comprising a plurality of unit cells each including: an information storage region responsive to a physical stimulus and capable of a transition from a first electrical potential state to a second electrical potential state according to the physical stimulus; a driving element for providing at an output portion thereof an electrical potential according to the electrical potential state of the information storage region; and a switching element connected to the output portion of the driving element; the physical quantity distribution sensor further comprising: an output section for receiving, when the switching element is electrically conductive, an output from the driving element which is connected to the switching element and outputting a signal according to the electric potential state of the information storage region; an output adjustment section for receiving the signal from the output section and adjusting the first electrical potential state of the information storage region in order that the signal may have an electrical potential level substantially equal to a reference electrical potential; and a unit cell selector for controlling an electrically conductive/non-conductive state of the switching element.

In a preferred embodiment, the driving element is a MOS transistor having: a gate connected to the information storage region; a source for functioning as the output portion and connected to the output section; and a drain for receiving a supply voltage.

In a preferred embodiment, the physical quantity distribution sensor further comprises a load element connected to the source of the driving element wherein the driving element and the load element together form a source follower circuit.

In a preferred embodiment, the switching element is a MOS transistor having: a gate for receiving a signal from the unit cell selector; a drain connected to the source of the driving element; and a source connected to the output section.

In a preferred embodiment, the information storage region has: a sensing section for converting the physical stimulus into an electric charge; and a storage section for storing the electric charge.

In a preferred embodiment, the sensing section is a p-n junction type photoelectric conversion element.

In a preferred embodiment, the storage section is a p-n junction type capacitor element.

In a preferred embodiment, each of the plurality of unit cells further includes a reset element operable to perform a forcible reset of the electrical potential state of the information storage region to the first electrical potential state in response to a reset pulse.

In a preferred embodiment, the reset element is a MOS transistor that receives at a gate region thereof the reset pulse.

In a preferred embodiment, the reset element is a MOS transistor that receives at a gate region thereof the output of the output adjustment section.

In a preferred embodiment, the output of the output adjustment section is supplied, through the reset element, to the information storage region at the time when the reset element performs a reset of the electrical potential state of the information storage region.

In a preferred embodiment, the output of the output adjustment section is supplied to a gate region of the reset element when the reset element performs a reset of the electrical potential state of the information storage region.

In a preferred embodiment, the output adjustment section containing a single adjuster; and each of the unit cells being assigned the single adjuster.

In a preferred embodiment, the plurality of unit cells are arranged forming a matrix of rows and columns; the unit cell selector has row selection circuits for selecting respective rows of unit cells of the matrix; and an output of the row selection circuit causes the switching elements of a selected row of unit cells to conduct and allows the reset pulse to be transmitted to the reset elements of the selected row of unit cells.

In a preferred embodiment, the physical quantity distribution sensor further comprises a sampling hold circuit connected to the output section.

In a preferred embodiment, (a) the plurality of unit cells are arranged to form a matrix of rows and columns; (b) the unit cell selector has: column selection circuits for selecting respective columns of unit cells of the matrix; column selection elements connected between each of the columns of unit cells and the output section; and selected column reset elements connected between each of the columns of unit cells and an input section at which the reset pulse is applied; (c) the column select element supplies, in response to an output of the column selection circuit, the output of the driving element in the unit cell in a selected column to the output section; and (d) the selected column reset element applies, in response to the output of the column selection circuit, the reset pulse to the reset element in the selected column.

In a preferred embodiment, the physical quantity distribution sensor further comprises feedback row selection elements connected between each of the columns of unit cells and the output adjustment section, wherein the feedback row selection element is operable to transmit the output of the output adjustment section to the reset element in the unit cell in the selected column.

The present invention provides a method of driving a physical quantity distribution sensor comprising a plurality of unit cells, each such unit cell including: an information storage region responsive to a physical stimulus and capable of a transition from a first electrical potential state to a second electrical potential state according to the physical stimulus; a driving element for providing at an output portion thereof an electrical potential according to the electrical potential state of the information storage region; and a switching element connected to the driving element; the driving method comprising the steps of: sending a signal according to the electric potential state of the information storage region by virtue of the driving element through the switching element, when the switching element is electrically conductive; and adjusting the first electrical potential state of the information storage region in order that the output of the driving element may substantially equal a reference electrical potential, when the switching element is electrically conductive.

The present invention provides a method of driving a physical quantity distribution sensor comprising a plurality of unit cells, each such unit cell including: an information storage region responsive to a physical stimulus and capable of a transition from a first electrical potential state to a second electrical potential state according to the physical stimulus; a driving element for providing at an output portion thereof an electrical potential according to the electrical potential state of the information storage region; and a switching element connected to the driving element; the driving method comprising the steps of: sending a signal according to the electric potential state of the information storage region by virtue of the driving element selected through the switching element, when the switching element is electrically conductive; and adjusting the first electrical potential state of the information storage region in order that the signal may have an electrical potential level substantially equal to a reference electrical potential, when the switching element is electrically conductive.

In a preferred embodiment, the adjustment step is carried out by a feedback circuit.

In a preferred embodiment, the adjustment step is carried out at the time of performing a reset of the electrical potential state of the information storage region to the first electrical potential state.

In a preferred embodiment, the plurality of unit cells are arranged forming a matrix of rows and columns; and the adjustment step is performed on every unit cell in the selected row after a step of sending a signal according to the electrical potential state of the information storage region for all unit cells in each row of the matrix is completed.

In a preferred embodiment, the plurality of unit cells are arranged forming a matrix of rows and columns; and after a step of sending a signal according to the electrical potential state of the information storage region for a single unit cell in a selected row of the matrix is completed, the adjustment step is performed on the unit cell.

In a preferred embodiment, during a step of sending signals according to the electrical potential state of the information storage region for each unit cell in the selected row, the signals are subjected to sampling.

DESCRIPTION OF THE PREFERRED EMBODIMENTS

First Embodiment

Referring to the accompanying drawing figures, a first embodiment of the physical quantity distribution sensor of the present invention is described.

Figure 1:
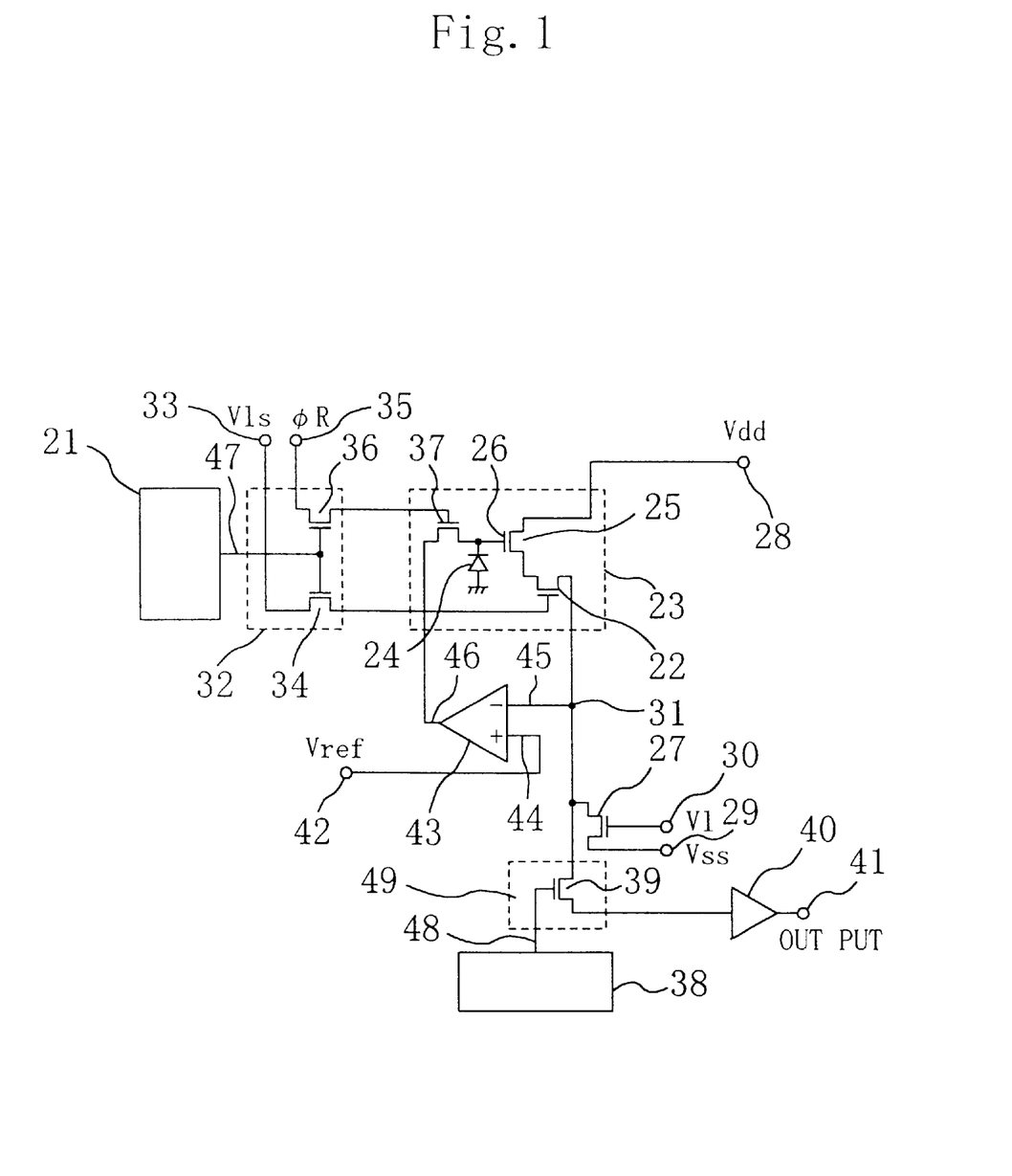
FIG. 1 shows a major portion of a first embodiment of the physical quantity distribution sensor of the present invention.

FIG. 1 illustrates major structural components of the physical quantity distribution sensor. The physical quantity distribution sensor is an amplification type solid-state imaging device. In practice the sensor has a plurality of unit cells that are one-/two-dimensionally arranged on a semiconductor substrate. With a view to providing a simple description of the present embodiment, only one unit cell is shown in FIG. 1 and the relationship of the unit cell with the other structural components will be described.

The unit cell of FIG. 1 is a picture element (pixel) 23. The pixel 23 comprises: a photoelectric conversion/storage region (information storage region) 24 being responsive to incident light and capable of a transition from a first electrical potential state (initial state) to a second electrical potential state according to the amount of the received light; a driving transistor (D-Tr) 25 for performing amplification operations according to the electrical potential state of the region 24; a pixel selection transistor (switching element) 22 for selecting the D-Tr 25; and a pixel reset transistor 37 for performing a forcible reset of the electrical potential state of the region 24 to the initial state.

The photoelectric conversion/storage region 24 of the present embodiment is formed by a p-n junction type photodiode. This photodiode serves as not only a photoelectric conversion section operable to photoelectrically convert received incident light into a signal charge but also a storage section for storing the signal charge. Instead of employing the region 24 of the present embodiment, a different configuration may be employed in which a photoelectric conversion element is provided independently of a storage element. In such a case, the storage element may be implemented by a p-n junction type capacitor or a stack type capacitor.

The output from the D-Tr 25 of the pixel 23 that was selected from a plurality of pixels(not shown) is applied to an output buffer 40 through the Tr 22 and a column selection transistor 39 as well as to a minus input section 45 of an operational amplifier 43. Note that, throughout the specification of this application, by "the output of a driving element" is meant an electrical potential level at an output portion of the driving element. The output from the D-Tr 25 functioning as the driving element is determined by an electrical potential level at a gate region 26 of the D-Tr 25 and by a threshold voltage Vt of the D-Tr 25. The amount of electric current flowing in the D-Tr 25 is determined by a load transistor (L-Tr) 27 functioning as a load element.

A detailed explanation of the structure of the physical quantity distribution sensor of FIG. 1 is given below.

The physical quantity distribution sensor, shown in FIG. 1, has a vertical shift register (V-S/R) 21 for controlling both selected row driving and selected row reset driving. The V-S/R 21 has identical output sections 47. An output section 47 of the V-S/R 21 is connected to a gate region of a corresponding selected row driving transistor 34 and to a gate region of a corresponding selected row reset driving transistor 36, respectively, with a selected row driver 32 used as a buffer section. A drain of the Tr 34 is connected to a selected row driving voltage input section 33. When the Tr 34 is electrically conductive, a signal(Vls) applied at the input section 33 is supplied to a gate region of the Tr 22 in the same row. A drain of the Tr 36 is connected to a reset voltage input section 35. When the Tr 36 is electrically conductive, a reset voltage (φR) applied at the input section 35 is supplied to the gate region of the Tr 37 in the same row.

The voltage Vls applied at the input section 33 is transmitted through the Tr 34 of the driver 32 to the Tr 22 in the row selected by the V-S/R 21. A horizontal shift register (H-S/R) 38 has an output section 48 connected to a gate region of the corresponding Tr 39 of a horizontal driving section 49. The Tr 39 enters an electrically conductive state in response to the output from the H-S/R 38.

A drain of the D-Tr 25 is connected to a first supply voltage terminal 28. A source of the D-Tr 25 is connected to a drain of the L-Tr 27 through the Tr 22. A source of the L-Tr 27 is connected to a second supply voltage terminal 29. A gate region of the L-Tr 27 is connected to a load gate voltage (Vl) terminal 30. The D-Tr 25 and the L-Tr 27 together constitute a source follower circuit (SFC) in which the gate region 26 of the D-Tr 25 and a node 31 act as an input section and as an output section of the SFC, respectively. This SFC is operable to produce a change in the electrical potential of the output node 31 according to a change in the electrical potential of the gate region 26 of the D-Tr 25. The SFC functions as a first buffer. In this SFC, the L-Tr 27 servers as a constant-current supply and the source (output portion) electrical potential of the D-Tr 25 is found by subtraction of Vt (the threshold voltage) from a voltage applied to the gate region 26.

The output node 31 of the SFC is connected through the Tr 39 to the input section of the output buffer 40 and to the minus input section 45 of the operational amplifier 43. Coupled to a plus input section 44 of the operational amplifier 43 is a reference signal input section 42 at which a reference signal (reference electrical potential), Vref, is applied. The operational amplifier 43 has an output section 46 that is connected, through the Tr 37 of its corresponding pixel 23, to the region 24 and the gate region 26 of the Tr 25.

After the output buffer 40 produces a signal according to a signal charge stored in the region 24, the stored signal charge is reset. At the time when such a reset is carried out, the reset voltage φR, applied at the input section 35, is transmitted to the gate region of the Tr 37 by way of the Tr 36 of the driver 32. The output from the operational amplifier 43 is applied to the region 24 through the Tr 37 associated with the output section 46 of the operational amplifier 43. This arrangement constitutes a feedback circuit, and the output from the output section 46 is controlled such that the plus input section 44 and the minus input section 45 are identical in electrical potential with each other. As a result, during the reset operation period the electrical potential state of the region 24 is adjusted in order that the output node 31 may have an electrical potential equal to the reference electrical potential Vref. Such potential state adjustment is carried out in a state equal to that of the normal signal output generation time. If the reference signal electrical potential is set such that it falls below Vdd by more than a value equivalent to Vt (the threshold voltage of the Tr 25), this makes it possible to achieve stable operations.

The present embodiment provides the advantage that the initial state of the region 24 can be adjusted with high accuracy because feedback by the operational amplifier 43 is performed in a state equal to that of the normal signal output generation time. Additionally, not based on an electrical potential present at a node located between the D-Tr 25 and the Tr 22 but based on another present at a node located between the Tr 22 and the output buffer 40, the region 24 is subjected to initial state adjustment. Because of this, even when a plurality of pixels 23 are arranged, there is no need to provide additional interconnection lines for establishing connections between the pixels 23 and their corresponding operational amplifiers 43 or additional switching elements. This makes it possible to control the increase in element dimensions even when the number of pixels is great.

If a plurality of pixels including the pixel 23 shown in FIG. 1 are arranged one-dimensionally, this can form a linear sensor. Two dimensional arrangement of the pixels can form an area sensor.

Second Embodiment

Figure 2:
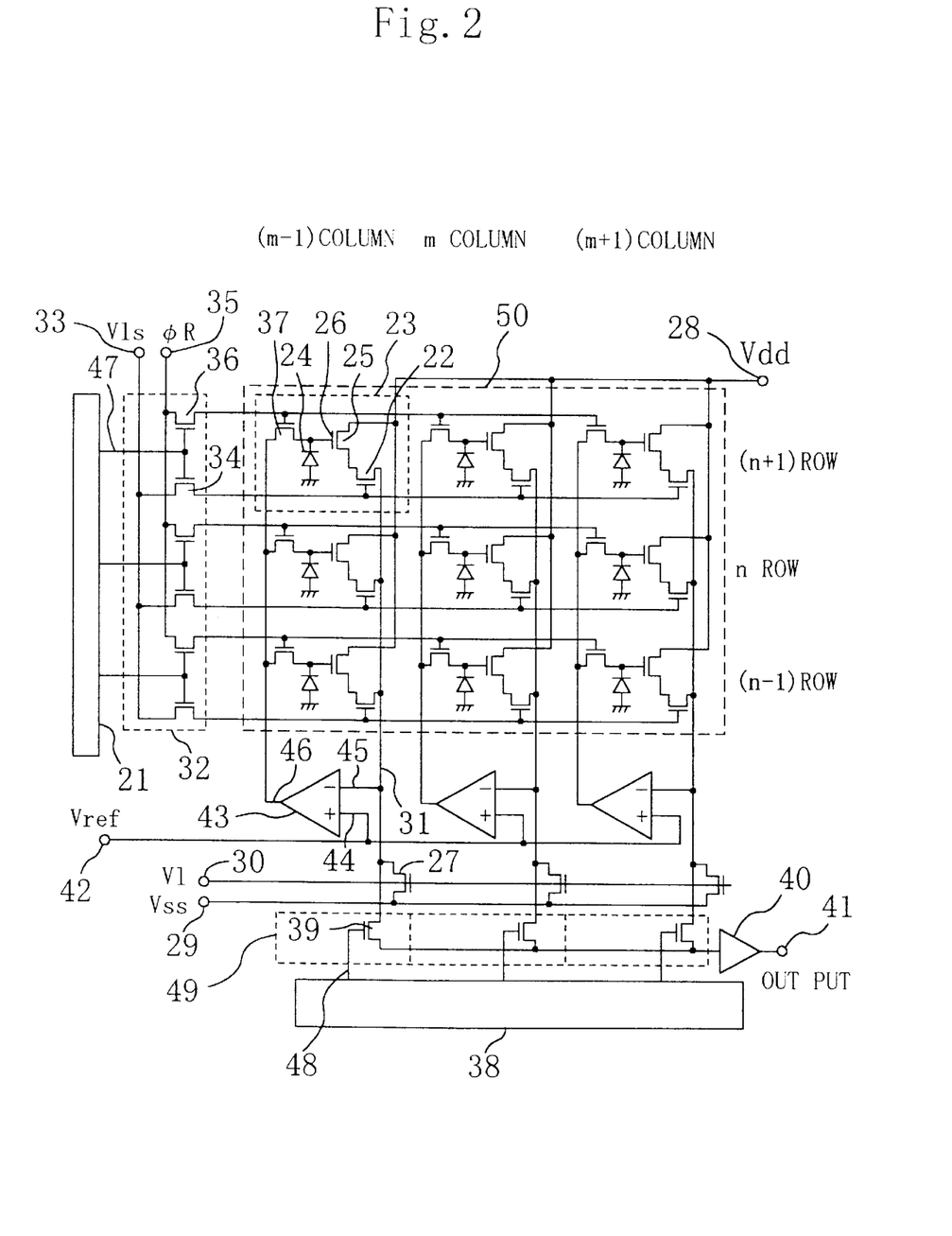
FIG. 2 is a circuit diagram showing a second embodiment of the physical quantity distribution sensor of the present invention.

FIG. 2 illustrates a second embodiment of the physical quantity distribution sensor of the present invention.

In accordance with the physical quantity distribution sensor of the present embodiment, the pixels 23 are arranged in a physical quantity sense storage region 50 forming a matrix of rows and columns. Referring to FIG. 2, therein shown are the pixels 23 in specific rows and columns, namely an (n−1)th row, an nth row, an (n+1)th row, an (m−1)th column, an mth column, and an (m+1)th column, where each of the numbers n and m is an integer. Of the structural elements shown in FIG. 2, the same structural elements that FIG. 1 shows have been assigned the same reference numerals.

In the present embodiment, each D-Tr 25 and one L-Tr 27 in the same column together form a source follower circuit (SFC). In other words, a drain of the L-Tr 27 in a certain column is connected to a common interconnection line coupled with the sources of the pixel selection Trs 22 in the column.

Each column is provided with a single operational amplifier 43. The minus input section 45 of the operational amplifier 43 is connected to the SFC output node 31 in the corresponding column. Each operational amplifier 43 has an output section that is connected to the photoelectric connection/storage region 24 through the pixel reset Tr 37 in its corresponding column. Additionally, the plus input sections 44 of each operational amplifier 43 are connected in common to the input section 42.

Figure 3:
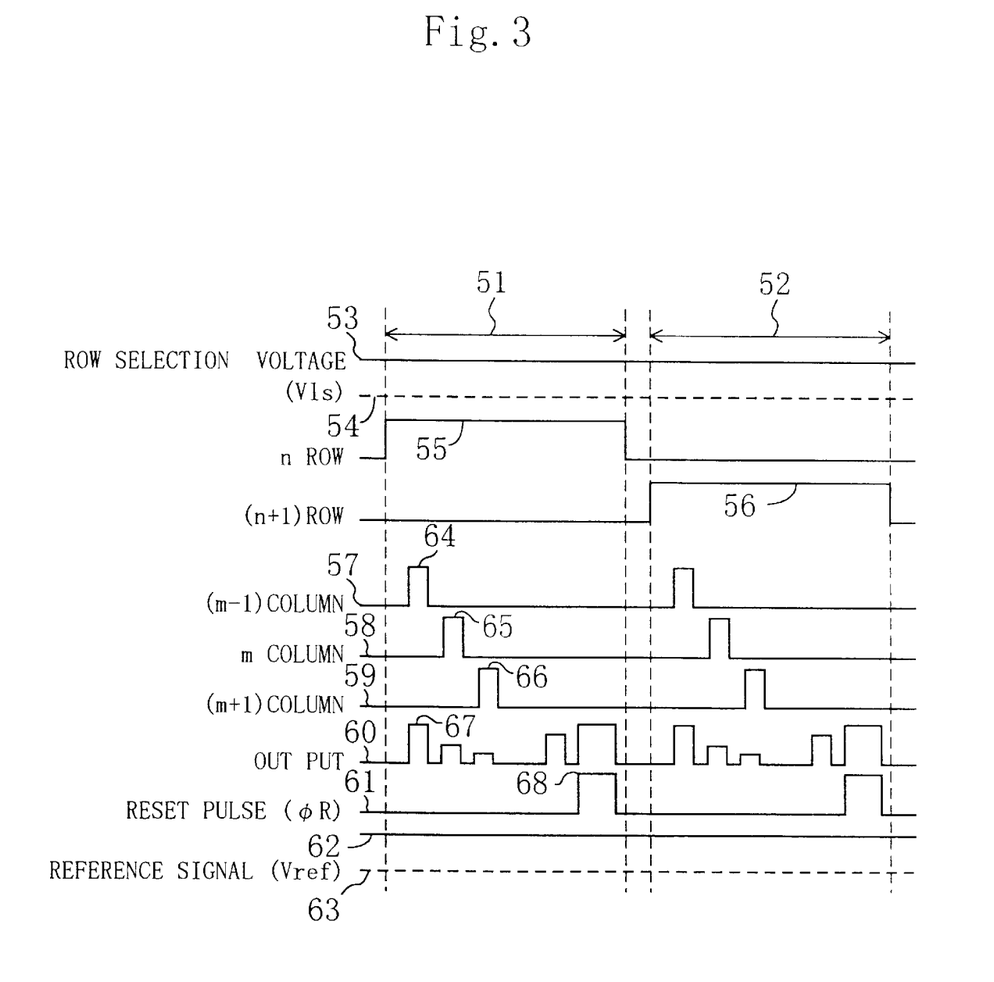
FIG. 3 is a timing diagram showing an embodiment of the physical quantity distribution sensor driving method of the present invention.

Referring to FIG. 3 together with FIG. 2, a method of driving the present physical quantity distribution sensor is explained.

A selected row driving voltage (Vls) 53 in the state of HIGH with respect to a voltage reference point (0V) 54, is applied to the input section 33 (see FIG. 3), during which the Trs 34 are placed in sequence in the electrically conductive state by the output sections 47 of the V-S/R 21. The Tr 34 of each row provides in turn a row selection voltage in response to outputs from the V-S/R 21. This row selection voltage is defined by the selected row driving voltage (Vls) which is applied at the input section 33. More specifically, Vls is applied to the gate regions of the Trs 22 in each row through each Tr 34. By virtue of application of the row selection voltage, all the Trs 22 in a selected row are placed in the conductive state at the same time. As can be seen from FIG. 3, after a row selection voltage 55 for the nth row is provided in a period 51 a row selection voltage 56 for the (n+1)th row is provided in a period 52.

During the period in which each of the rows is being selected, the output sections 48 of the H-S/R 38 provide in turn a column selection voltage. In FIG. 3, a column selection voltage 64 for the (m−1)th column, a column selection voltage 65 for the mth column, and a column selection voltage 66 for the (m+1)th column are provided in that order. These column selection voltages 64, 65, 66 cause the Trs 39 in their respective corresponding columns to be conductive, in consequence of which the (m−1)th column, the mth column, and the (m+1)th column are selected in sequence. As a result, the outputs of each pixel 23 in the selected row are applied one after another to the output buffer 40. In this way, the Tr 39 of the driver 49 in a column selected by the H-S/R 38 enters the conductive state within the period 51 in which the nth row was selected. As a result, the foregoing columns are selected one after another, which allows outputs 60 from each pixel in the nth row are output through the output buffer 40.

During the time that each column is being selected, a reset voltage 61 applied at the input section 35 is in the state of LOW. A reset pulse 68 is applied to the input section 35 prior to the expiration of a selection period of each row. By virtue of the reset pulse 68 that is applied after signals from each column of the nth row are provided, a feedback circuit including the operational amplifier 43 operates and the electrical potentials of all the regions 24 in the nth row are set in order that the SFC outputs from each column at reset time may equal a reference signal 62. Within the period 51 during which the nth row is being selected, both the output of all the pixels in the nth row and the electrical potential adjustment and reset of the regions 24 are completed. Thereafter, the (n+1)th row is selected in the period 52 and the same drive is carried out. Applied at the input section 42 is the reference signal 62.

In accordance with the present embodiment, each operational amplifier 43 performs initial state adjustment operations on a plurality of pixels in its corresponding column at the same time. This arrangement makes it possible to adjust all the pixels with a less number of operational amplifiers in comparison with cases in which operational amplifiers are provided per pixel.

Third Embodiment

Figure 4:
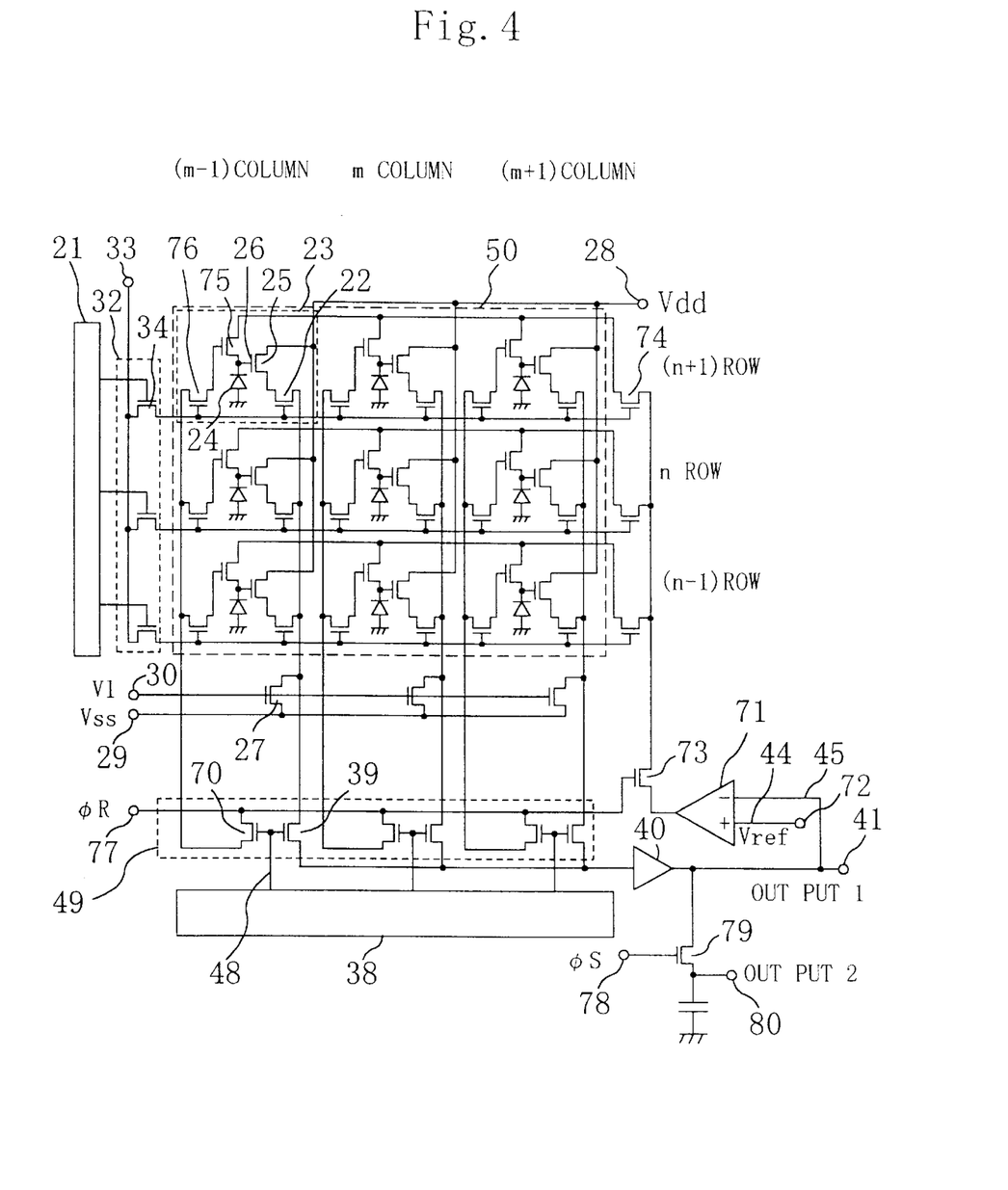
FIG. 4 is a circuit diagram showing a third embodiment of the physical quantity distribution sensor of the present invention.

FIG. 4 illustrates a third embodiment of the physical quantity distribution sensor of the present invention. The difference between the second embodiment and the present embodiment is that the latter is provided with only one operational amplifier 71 that is shared between each pixel. The plus input section 44 of the operational amplifier 71 accepts a reference signal, ref, through a reference signal input section 72 connected to the plus input section 44. On the other hand, an output #1 is applied, through the output buffer 40 and an output section 41, to the minus input section 45 of the operational amplifier 71.

The operational amplifier 71 has an output section that is connected, through a single transistor 73 which conducts during the reset period only, to the drains of feedback row selection transistors 74 allocated to their respective rows. The sources of the Trs 74 are connected to the drains of pixel reset transistors Tr 75 in their corresponding rows. The source of the Tr 75 is connected to the region 24 in the same pixel. The gate of the Tr 75 is connected to the source of a reset row selection transistor 76. The drain of the Tr 76 is connected to a reset voltage input section 77 through a selected column reset driving transistor 70 allocated to a respective column. When the H-SIR 38 selects a certain column and when the Tr 70 in the selected column is placed in the conductive state, the reset voltage is applied, through the Tr 76 in the already selected row, to the gate region of the Tr 75. The Tr 75 then conducts. At this point in time, an output voltage from the operational amplifier 71 is applied, through the Tr 75 in the conductive state, to the photoelectric conversion/storage region 24. As a result, the output of the operational amplifier 71 is supplied to the region 24 designated by the selected row and column, only during the reset period.

The output section of the H-S/R 38 is connected to the gate regions of the Trs 39 and 70, with the driver 49 used as a third buffer section, and controls selected column driving and selected column reset driving.

The output buffer 40 has an output section that is connected to a capacitor through a sampling transistor 79. A gate region of the sampling transistor 79 is connected to a sampling pulse input section 78. A sampling output section 80 is connected between the the sampling transistor 79 and the capacitor to form a sample hold circuit.

Figure 5:
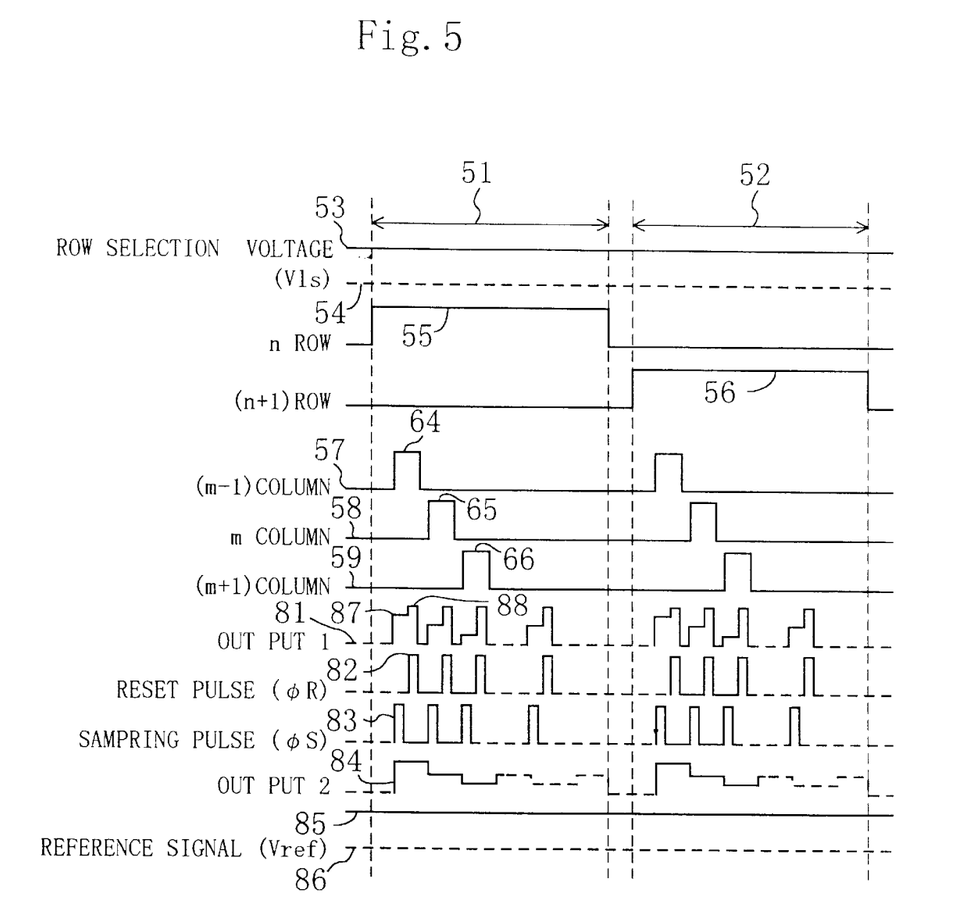
FIG. 5 is a timing diagram showing another embodiment of the physical quantity distribution sensor driving method of the present invention.

Referring now to FIG. 5 in addition to FIG. 4, a method of driving the physical quantity distribution sensor of the present embodiment is described.

Reference numeral 81 denotes the output voltage of the output section 41. Reference numeral 82 denotes a reset pulse applied to the input section 77. Reference numeral 83 denotes a sampling pulse applied to the input section 78 for the sampling of outputs. Reference numeral 84 denotes an output voltage supplied to the output section 80. Reference numeral 85 denotes a reference signal applied to the input section 72 connected to a plus input section of the operational amplifier 71. Reference numeral 86 denotes a reference voltage (0V) of the reference signal 85. Reference numeral 87 denotes the output of a pixel designated by the nth row and the (m−1)th column. Reference numeral 88 denotes an output, with the pixel reset.

In the respect that the output from the SFC is provided through the output buffer 40 when each column is selected, with a certain row chosen, the physical quantity distribution sensor of the present embodiment and the physical quantity distribution sensor of the second embodiment are identical. The difference in drive between these embodiments is that a plurality of reset pulses 82 are applied during the column selection period in order to perform a reset every time each pixel carries out its output operation. More specifically, when the H-S/R 38 selects the (m−1)th column in the period 51 in which the nth row was selected by the V-S/R 21, information, stored in a pixel defined by the nth row and the (m−1)th column, is provided through the Tr 39 and the output buffer 40. By application of the reset pulse 82 during the period that the (m−1)th column is being selected by the H-S/R 38, the reset voltage is applied, through the Tr 76, to the gate of the Tr 75.

For the reason that the output 81 given from the output section 41 through the output buffer 40 and the reference signal 85 are applied to the minus input. section 45 of the operational amplification 71 and to the input section 72 connected to the plus input section 44, respectively, the output voltage of the operational amplifier 71 is applied, through the Tr 73 which conducts only during the reset period and the Tr 74, to the Tr 75 as a supply voltage.

By such arrangement, the electrical potential of the region 24 is set such that the SFC output at reset time equals the reference signal 85. Such operations are performed on every pixel.

The output of the present physical quantity distribution sensor, indicated as the output 81, appears, in alternating fashion, as the pixel output 87 from pixel and as the output 88 at pixel reset time. It is however preferred that only the output 87 is extracted from the physical quantity distribution sensor. In order to achieve such exclusive extraction, the sampling pulse 83 is applied to the input section 78 connected to the gate region of the Tr 79 during the pixel output operation, to hold the output 87 in a capacitor section connected to the Tr 79 for output from the output section 80. Because of this, only the output 87 can be extracted from the pixels.

The present embodiment requires only one operational amplifier capable of being shared by all the pixels, resulting in a reduction of the device size. However, the operational amplifier of the present embodiment must be faster than the second embodiment operational amplifier.

Fourth Embodiment

Figure 6:
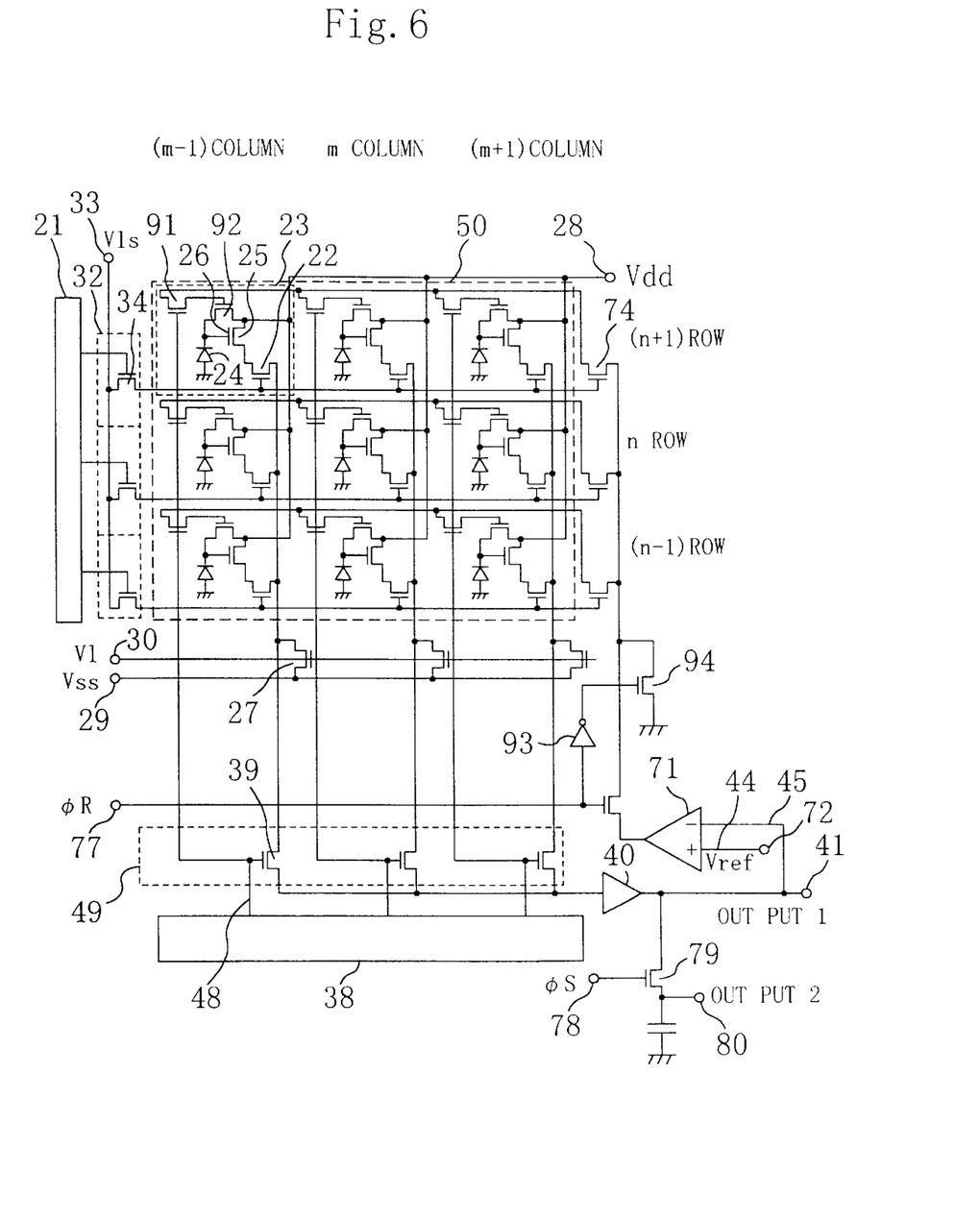
FIG. 6 is a circuit diagram showing a fourth embodiment of the physical quantity distribution sensor of the present invention.

FIG. 6 illustrates a fourth embodiment of the physical quantity distribution sensor of the present invention. Reference numeral 91 is a reset column selection transistor. 92 is a pixel reset transistor. Reference numeral 93 is an inverter. Reference numeral 94 is a grounding transistor.

Like the third embodiment, after each pixel output, reset operations are carried out during the column selection in the present embodiment. In the third embodiment, the destination to which the output voltage of the operational amplifier 71 is supplied is the supply voltage input section of the Tr 75; however, in the present embodiment the operational amplifier output voltage is supplied to the gate region of the Tr 92 through Tr 74. The Tr 91, whose gate region receives a column selection pulse, is provided so as to control the supply of voltage to the gate region of the Tr 92.

In accordance with the present embodiment, the operational amplifier 71 gives its output to the gate region of the Tr 92, which requires for the Tr 92 to preferably be in the full open state in any period except the reset period. Stated another way, it is preferred that the level of voltage that is applied to the gate region of the Tr 92 in any period except the reset period is exactly zero volt. To achieve this, the Tr 94, whose gate region is connected to the output of the inverter 93 operable to invert the reset pulse 82, is provided.

The electrical potential waveforms of the individual components of the present physical quantity distribution sensor are the same as the ones shown in FIG. 5.

Fifth Embodiment

Figure 7:
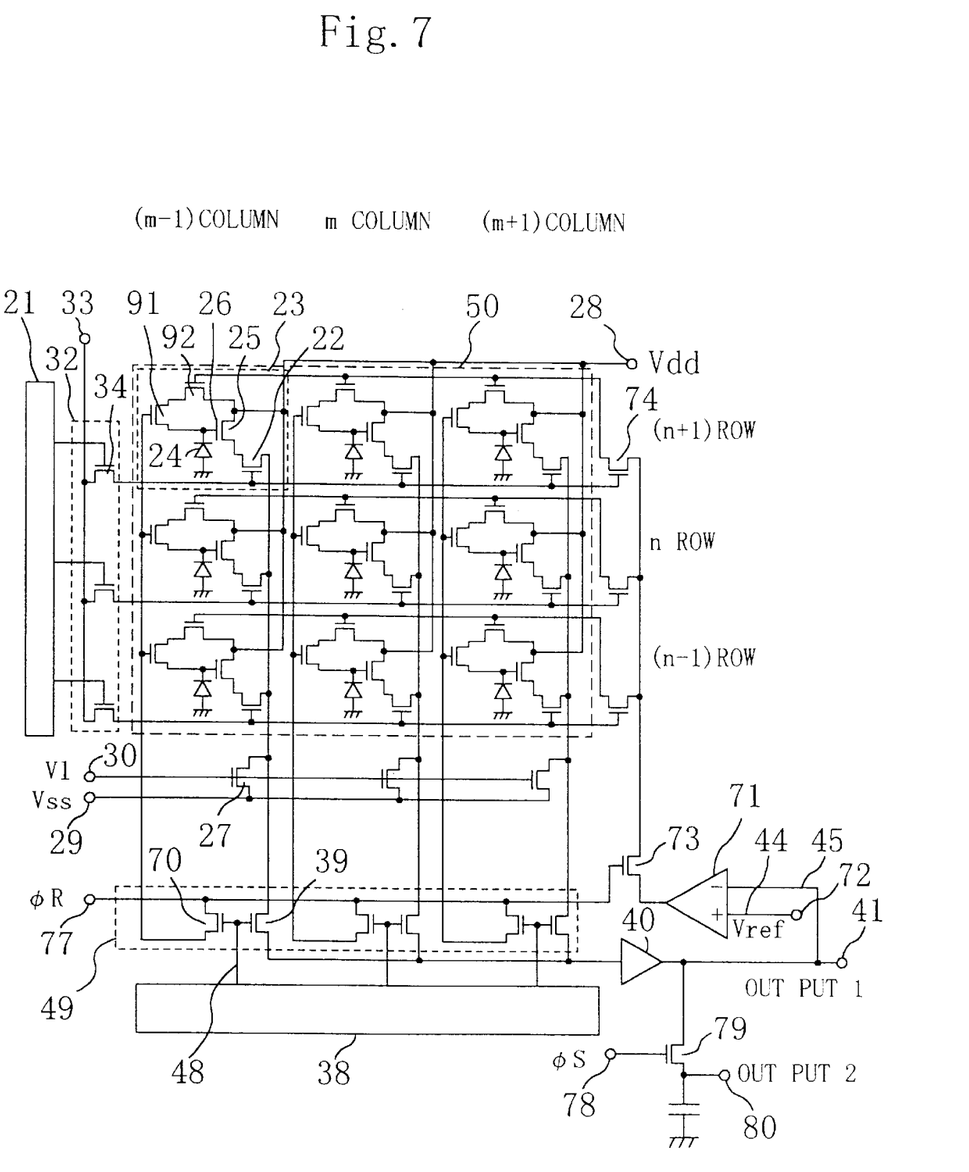
FIG. 7 is a circuit diagram showing a fifth embodiment of the physical quantity distribution sensor of the present invention.

Referring now to FIG. 7, therein shown is a fifth embodiment of the physical quantity distribution sensor of the present invention. Like the fourth embodiment, the output voltage of the operational amplifier 71 is applied to the gate region of the Tr 92 in the present embodiment. The present embodiment differs from the fourth embodiment in that the Tr 91 controls the electrically conductive/non-conductive state between the region 24 and the Tr 92. The FIG. 7 configuration achieves the same drive that the fourth embodiment does.

The description has been made, for the sake of simplification, in terms of photoelectric conversion/storage regions having a photoelectric conversion section as well as a signal charge storage section. Needless to say, the present invention may find applications also in cases where a photoelectric conversion section is formed separately from a signal charge storage section.

In addition, the description has been made taking the case in which the output is extracted through output buffer. However, the provision of an output buffer is not necessarily required. The output may be provided to outside the sensor by wiring or terminal. It is to be noted that the output section, described in the specification of the present application, broadly means portions having the function of providing a signal according to the electrical potential state of the information storage region to outside the sensor, regardless of the presence or absence of an output buffer. The present invention has been described in terms of embodiments having a feedback circuit making utilization of an operational amplifier as an output adjustment means; however, either a differential inversion amplifier or a comparator may be used as an output adjustment means.

The present invention has been described in terms of applications in solid-state imaging devices. If a sense section is provided for the detection of a physical quantity of, for example, X ray, infrared ray, temperature, magnetic field, electric field, and electric voltage, and if a change in electrical potential caused by a received physical quantity is transmitted to a driving transistor gate region, this allows the present invention to find applications in general physical quantity distribution sensors in addition to applications in the field of light. In the event of detecting physical quantities other than light, e.g., a temperature distribution, it is suitable to use a element that makes changes in electrical potential or voltage depending on the temperature as a substitute for a photoelectric conversion/storage region. When detecting a voltage distribution, a piezoelectric element may be used instead of using a photoelectric conversion/storage region.

In the present invention, an output adjustment section is provided which receives the output of a selected driving element at the time when a switching element connected to the driving element is in the conductive state and adjusts the electrical potential state of an information storage region in order that the driving element output may substantially equal a reference electrical potential, as a result of which feedback is carried out based on the output in the same state as that of the actual output operation time. This results in making improvements on feedback accuracy. Additionally, there is no need for newly providing transistors in each unit cell in addition to the switching elements for use in unit cell selection, for the operations of the output adjustment section. Accordingly, the present invention may find applications in area sensors in which great numbers of pixels are two-dimensionally arranged.

What is claimed is:

1. A physical quantity distribution sensor comprising a plurality of unit cells each including:
    an information storage region responsive to a physical stimulus and capable of a transition from a first electrical potential state to a second electrical potential state according to the physical stimulus;
    a driving element for providing at an output portion thereof an electrical potential according to the electrical potential state of said information storage region; and
    a switching element connected to the output portion of the driving element;
said physical quantity distribution sensor further comprising:
    an output section for receiving, when said switching element is electrically conductive, an output from said driving element which is connected to said switching element and outputting a signal according to the electric potential state of said information storage region;
    an output adjustment section for receiving, when said switching element is electrically conductive, said output from the driving element and adjusting said first electrical potential state of said information storage region in order that said output from the driving element may substantially equal a reference electrical potential; and
    a unit cell selector for controlling an electrically conductive/non-conductive state of said switching element.

2. The physical quantity distribution sensor of claim 1, wherein said driving element is a MOS transistor having: a gate connected to said information storage region; a source for functioning as said output portion and connected to said output section; and a drain for receiving a supply voltage.

3. The physical quantity distribution sensor of claim 2 further comprising a load element connected to said source of said driving element wherein said driving element and said load element together form a source follower circuit.

4. The physical quantity distribution sensor of claim 2, wherein said switching element is a MOS transistor having: a gate for receiving a signal from said unit cell selector; a drain connected to said source of said driving element; and a source connected to said output section.

5. The physical quantity distribution sensor of claim 1, wherein said information storage region has:
    a sensing section for converting said physical stimulus into an electric charge; and
    a storage section for storing said electric charge.

6. The physical quantity distribution sensor of claim 5, wherein said sensing section is a p-n junction type photoelectric conversion element.

7. The physical quantity distribution sensor of claim 6, wherein said storage section is a p-n junction type capacitor element.

8. The physical quantity distribution sensor of claim 1, wherein each of said plurality of unit cells further includes a reset element operable to perform a forcible reset of the electrical potential state of said information storage region to said first electrical potential state in response to a reset pulse.

9. The physical quantity distribution sensor of claim 8, wherein said reset element is a MOS transistor that receives at a gate region thereof said reset pulse.

10. The physical quantity distribution sensor of claim 8, wherein said reset element is a MOS transistor that receives at a gate region thereof the output of said output adjustment section.

11. The physical quantity distribution sensor of claim 8, wherein the output of said output adjustment section is supplied, through said reset element, to said information storage region at the time when said reset element performs a reset of the electrical potential state of said information storage region.

12. The physical quantity distribution sensor of claim 10, wherein the output of said output adjustment section is supplied to a gate region of said reset element when said reset element performs a reset of the electrical potential state of said information storage region.

13. The physical quantity distribution sensor of claim 1,
    said plurality of unit cells being divided into a plurality of groups;
    said output adjustment section containing a plurality of functionally identical adjusters; and
    said plurality of groups being assigned said adjusters, respectively.

14. The physical quantity distribution sensor of claim 13, wherein each such adjuster is formed by an operational amplifier, or an inverting differential amplifier, or a comparator.

15. The physical quantity distribution sensor of claim 14, wherein said plurality of adjusters are f ed said reference electrical potential through a common line.

16. The physical quantity distribution sensor of claim 8, wherein:
    said plurality of unit cells are arranged forming a matrix of rows and columns;
    said unit cell selector has row selection circuits for selecting respective rows of unit cells of said matrix; and
    an output of said row selection circuit causes said switching elements of a selected row of unit cells to conduct and allows said reset pulse to be transmitted to said reset elements of said selected row of unit cells.

17. The physical quantity distribution sensor of claim 1, wherein:
    (a) said plurality of unit cells are arranged forming a matrix of rows and columns;
    (b) said unit cell selector has:
        column selection circuits for selecting respective columns of unit cells of said matrix; and
        column selection elements connected between each of said columns of unit cells and said output section; and
    (c) said column select element supplies, in response to an output of said column selection circuit, the output of the driving element in the unit cell in a selected column to said output section.

18. The physical quantity distribution sensor of claim 8, wherein:
(a) said plurality of unit cells are arranged to form a matrix of rows and columns;
(b) said unit cell selector has:
   column selection circuits for selecting respective columns of unit cells of said matrix;
   column selection elements connected between each of said columns of unit cells and said output section; and
   selected column reset elements connected between each of said columns of unit cells and an input section at which said reset pulse is applied;
(c) said column select element supplies, in response to an output of said column selection circuit, the output of the driving element in the unit cell in a selected column to said output section; and
(d) said selected column reset element applies, in response to the output of said column selection circuit, said reset pulse to said reset element in said selected column.

19. A physical quantity distribution sensor comprising a plurality of unit cells each including:
an information storage region responsive to a physical stimulus and capable of a transition from a first electrical potential state to a second electrical potential state according to said physical stimulus;
a driving element for providing at an output portion thereof an electrical potential according to the electrical potential state of said information storage region; and
a switching element connected to the output portion of the driving element;
said physical quantity distribution sensor further comprising:
an output section for receiving, when said switching element is electrically conductive, an output from said driving element which is connected to said switching element and outputting a signal according to the electric potential state of said information storage region;
an output adjustment section for receiving said signal from said output section and adjusting said first electrical potential state of said information storage region in order that said signal may have an electrical potential level substantially equal to a reference electrical potential; and
a unit cell selector for controlling an electrically conductive/non-conductive state of said switching element.

20. The physical quantity distribution sensor of claim 19, wherein said driving element is a MOS transistor having: a gate connected to said information storage region; a source for functioning as said output portion and connected to said output section; and a drain for receiving a supply voltage.

21. The physical quantity distribution sensor of claim 20 further comprising a load element connected to said source of said driving element wherein said driving element and said load element together form a source follower circuit.

22. The physical quantity distribution sensor of claim 20, wherein said switching element is a MOS transistor having: a gate for receiving a signal from said unit cell selector; a drain connected to said source of said driving element; and a source connected to said output section.

23. The physical quantity distribution sensor of claim 19, wherein said information storage region has:

a sensing section for converting said physical stimulus into an electric charge; and
a storage section for storing said electric charge.

24. The physical quantity distribution sensor of claim 23, wherein said sensing section is a p-n junction type photoelectric conversion element.

25. The physical quantity distribution sensor of claim 24, wherein said storage section is a p-n junction type capacitor element.

26. The physical quantity distribution sensor of claim 19, wherein each of said plurality of unit cells further includes a reset element operable to perform a forcible reset of the electrical potential state of said information storage region to said first electrical potential state in response to a reset pulse.

27. The physical quantity distribution sensor of claim 26, wherein said reset element is a MOS transistor that receives at a gate region thereof said reset pulse.

28. The physical quantity distribution sensor of claim 26, wherein said reset element is a MOS transistor that receives at a gate region thereof the output of said output adjustment section.

29. The physical quantity distribution sensor of claim 26, wherein the output of said output adjustment section is supplied, through said reset element, to said information storage region at the time when said reset element performs a reset of the electrical potential state of said information storage region.

30. The physical quantity distribution sensor of claim 28, wherein the output of said output adjustment section is supplied to a gate region of said reset element when said reset element performs a reset of the electrical potential state of said information storage region.

31. The physical quantity distribution sensor of claim 19,
said output adjustment section containing a single adjuster; and
each of the unit cells being assigned said single adjuster.

32. The physical quantity distribution sensor of claim 26, wherein:
said plurality of unit cells are arranged forming a matrix of rows and columns;
said unit cell selector has -row selection circuits for selecting respective rows of unit cells of said matrix; and
an output of said row selection circuit causes said switching elements of a selected row of unit cells to conduct and allows said reset pulse to be transmitted to said reset elements of said selected row of unit cells.

33. The physical quantity distribution sensor of claim 19 further comprising a sampling hold circuit connected to said output section.

34. The physical quantity distribution sensor of claim 26, wherein:
(a) said plurality of unit cells are arranged to form a matrix of rows and columns;
(b) said unit cell selector has:
   column selection circuits for selecting respective columns of unit cells of said matrix;
   column selection elements connected between each of said columns of unit cells and said output section; and
   selected column reset elements connected between each of said columns of unit cells and an input section at which said reset pulse is applied;
(c) said column select element supplies, in response to an output of said column selection circuit, the output of the driving element in the unit cell in a selected column to said output section; and (d) said selected coumn reset element applies, in response to the output of said column selection circuit, said reset pulse to said reset element in said selected column.

35. The physical quantity distribution sensor of claim 33 further comprising feedback row selection elements connected between each of said columns of unit cells and said output adjustment section, wherein said feedback row selection element is operable to transmit the output of said output adjustment section to said reset element in said unit cell in said selected column.

36. A method of driving a physical quantity distribution sensor comprising a plurality of unit cells each including:

an information storage region responsive to a physical stimulus and capable of a transition from a first electrical potential state to a second electrical potential state according to said physical stimulus;

a driving element for providing at an output portion thereof an electrical potential according to the electrical potential state of said information storage region; and a switching element connected to the output portion of the driving element;

said driving method comprising the steps of:

sending a signal according to the electric potential state of said information storage region by virtue of said driving element through said switching element, when said switching element is electrically conductive; and adjusting said first electrical potential state of said information storage region in order that said output from the driving element may substantially equal a reference electrical potential, when said switching element is electrically conductive.

37. A method of driving a physical quantity distribution sensor comprising a plurality of unit cells each including:

an information storage region responsive to a physical stimulus and capable of a transition from a first electrical potential state to a second electrical potential state according to said physical stimulus;

a driving element for providing at an output portion thereof an electrical potential according to the electrical potential state of said information storage region; and a switching element connected to the output portion of the driving element;

said driving method comprising the steps of:

sending a signal from the driving element according to the electric potential state of said information storage region by virtue of said driving element through said switching element, when said switching element is electrically conductive; and adjusting said first electrical potential state of said information storage region in order that said signal may have an electrical potential level substantially equal to a reference electrical potential, when said switching element is electrically conductive.

38. The driving method of either claim 36 or claim 37, wherein said adjustment step is carried out by a feedback circuit.

39. The driving method of either claim 36 or claim 37, wherein said adjustment step is carried out at the time of performing a reset of the electrical potential state of said information storage region to said first electrical potential state.

40. The driving method of claim 36, wherein:

said plurality of unit cells are arranged forming a matrix of rows and columns; and said adjustment step is performed on every unit cell in said selected row after a step of sending a signal according to the electrical potential state of said information storage region for all unit cells in each row of said matrix is completed.

41. The driving method of claim 37, wherein:

said plurality of unit cells are arranged forming a matrix of rows and columns; and after a step of sending a signal according to the electrical potential state of said information storage region for a single unit cell in a selected row of said matrix is completed, said adjustment step is performed on said unit cell.

42. The driving method of claim 41, wherein, during a step of sending signals according to the electrical potential state of said information storage region for each unit cell in said selected row, said signals are subjected to sampling.

* * * * *